United States Patent
Yonekura

(10) Patent No.: US 7,578,513 B2
(45) Date of Patent: Aug. 25, 2009

(54) INFLATING SAFETY APPARATUS FOR LEAF SPRING TRAILERS AND VEHICLES

(75) Inventor: George Susumu Yonekura, San Jose, CA (US)

(73) Assignee: Research Machine Development, Inc., San Jose, CA (US)

( * ) Notice: Subject to any disclaimer, the term of this patent is extended or adjusted under 35 U.S.C. 154(b) by 161 days.

(21) Appl. No.: 11/179,830

(22) Filed: Jul. 11, 2005

(65) Prior Publication Data

US 2006/0170177 A1 Aug. 3, 2006

Related U.S. Application Data

(60) Provisional application No. 60/636,596, filed on Dec. 15, 2004.

(51) Int. Cl.
*B60G 11/46* (2006.01)

(52) U.S. Cl. .............. 280/124.17; 280/5.501; 280/5.514; 280/6.157; 280/124.163; 267/51

(58) Field of Classification Search .......... 280/6.157, 280/6.158, 6.151, 5.514, 124.17, 124.175, 280/124.163; 267/31, 51, 64.26; 254/93 VA, 254/45, 423

See application file for complete search history.

(56) References Cited

U.S. PATENT DOCUMENTS

| | | | | |
|---|---|---|---|---|
| 1,094,814 A | * | 4/1914 | Rinehart | .................... 267/37.4 |
| 3,054,425 A | * | 9/1962 | Pribonic | .................... 137/627.5 |
| 3,719,299 A | * | 3/1973 | Oehler | ...................... 414/495 |
| 3,730,550 A | * | 5/1973 | Thaxton | .............. 280/124.163 |
| 3,866,894 A | * | 2/1975 | Sweet et al. | .................. 267/31 |
| 4,181,324 A | * | 1/1980 | Hixon | ................. 280/124.102 |
| 4,323,141 A | * | 4/1982 | Ragan et al. | ................ 187/204 |
| 4,491,338 A | * | 1/1985 | Sheldrake | ............... 280/405.1 |
| 4,494,772 A | * | 1/1985 | Smith | .................. 280/124.163 |
| 4,746,133 A | * | 5/1988 | Hanser et al. | ............ 280/6.153 |
| 4,796,910 A | * | 1/1989 | Starr, Sr. | .............. 280/124.165 |
| 4,923,210 A | * | 5/1990 | Heider et al. | ............ 280/6.153 |
| 5,403,032 A | * | 4/1995 | Hellwig | ............... 280/124.163 |
| 5,509,687 A | * | 4/1996 | Thorndike | ............... 280/766.1 |
| 5,873,581 A | * | 2/1999 | Yale | ........................ 280/5.514 |
| 6,497,389 B1 | * | 12/2002 | Rawdon et al. | ......... 244/138 R |
| 6,895,648 B1 | * | 5/2005 | Willett | .................... 29/402.08 |
| 7,182,191 B2 | * | 2/2007 | Scott et al. | .................. 188/372 |

* cited by examiner

*Primary Examiner*—Paul N. Dickson
*Assistant Examiner*—George D. Spisich
(74) *Attorney, Agent, or Firm*—Haverstock & Owens LLP

(57) ABSTRACT

An apparatus for automatic lifting of a trailer frame upon failure of the leaf spring support comprising a housing including a first housing element and a second housing element, wherein the second housing element is positioned within and slidably coupled to the first housing element forming the housing; an air bag lifting device positioned within the housing, wherein upon actuation the lifting device exerts force to maintain a distance between the first housing element and the second housing element; and a trigger device coupled to the lifting device wherein the lifting device is actuated by the trigger device.

30 Claims, 7 Drawing Sheets

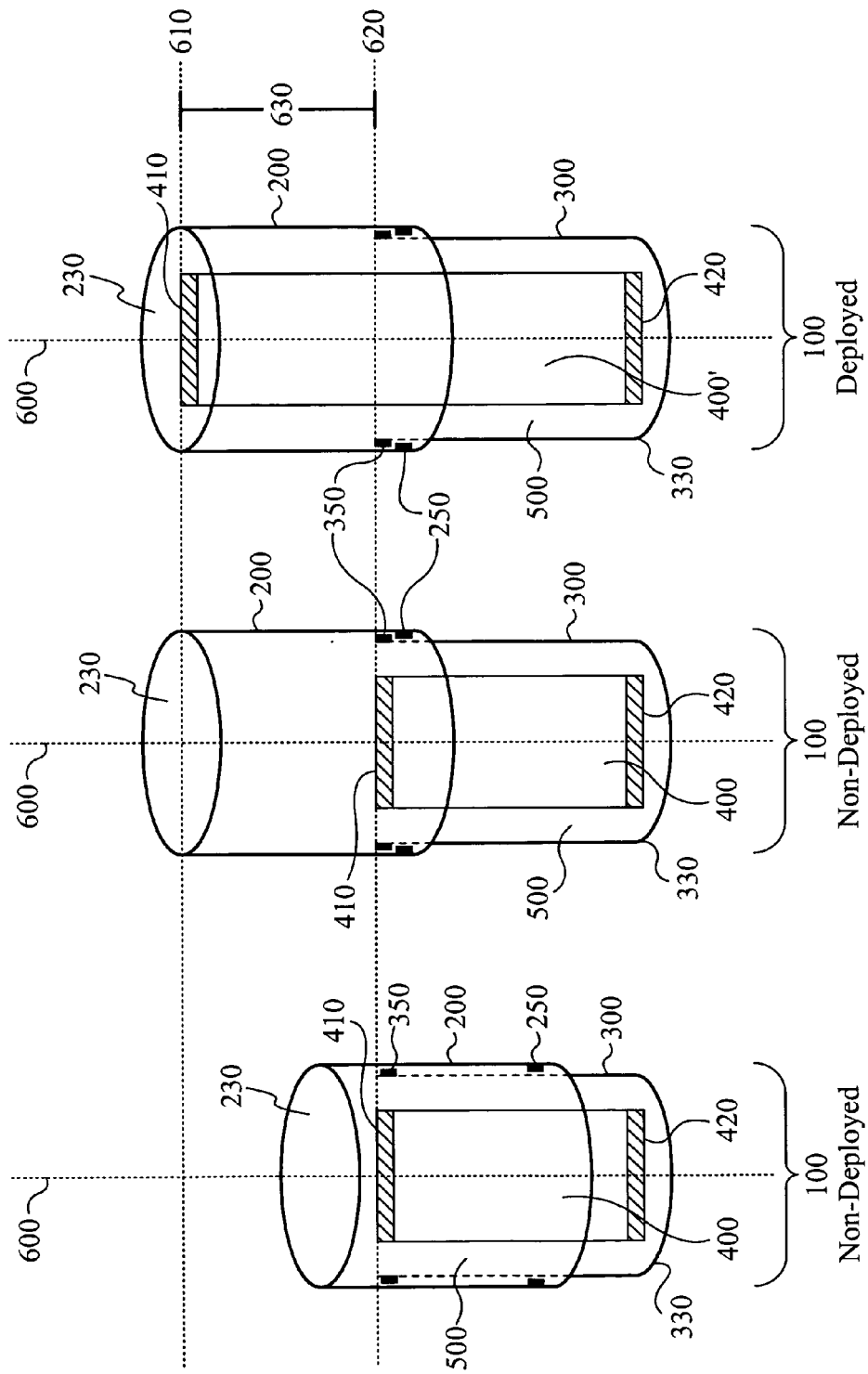

US 7,578,513 B2

INFLATING SAFETY APPARATUS FOR LEAF SPRING TRAILERS AND VEHICLES

RELATED APPLICATION

This Patent Application claims priority under 35 U.S.C. 119 (e) of the co-pending U.S. Provisional Patent Application Ser. No. 60/636,596 filed Dec. 15, 2004, and entitled "SAFETY DEVICE FOR LEAF SPRING SUPPORTED VEHICLES AND TRAILERS". The Provisional Patent Application, Ser. No. 60/636,596 filed Dec. 15, 2004, and entitled "SAFETY DEVICE FOR LEAF SPRING SUPPORTED VEHICLES AND TRAILERS" is also hereby incorporated by reference.

FIELD OF THE INVENTION

The present invention relates to the field of safety devices for trailers and vehicles with leaf spring suspension systems. More specifically, the present invention relates to the field of a safety device having the ability to prevent damage, accidents and inconvenience in instances of leaf spring suspension failure.

BACKGROUND OF THE INVENTION

Most trailers and older vehicles are designed with leaf spring supported suspension systems. Leaf springs comprise several metal strips joined to act as an elastic spring. The axle is coupled to the frame by a pair of leaf springs to provide flexible support. The leaf springs provide the suspension system for the trailer and allow the trailer to ride more smoothly on rough grounds. Though newer cars are manufactured with more sophisticated suspension systems, trailers are most often manufactured with leaf springs.

Leaf springs generally perform well as a rugged and durable suspension system but have been known to fail. Leaf springs fail for a number of reasons including: age, material quality and load size. When a leaf spring fails on a typical trailer, the frame is no longer vertically supported by the leaf spring coupled to the axle. The weight of the trailer then falls directly onto the tire. In addition to loss of vertical support, the trailer axle no longer has longitudinal support with respect to the frame.

Loss of vertical and longitudinal support poses a risk of injury to persons and property. Without vertical support, the trailer frame may come into contact with the axle. Further, the wheel well may come into contact with a rapidly rotating tire. This contact between a wheel well and a rapidly rotating tire causes damage in a number of ways including: the tire is shredded; the wheel is bent; and the intense friction damages the wheel well and the paint on the trailer. Loss of longitudinal support causes the axle to torque with respect to the trailer frame. Again, this could result in the tire coming into contact with the trailer frame or wheel well. When vertical and longitudinal support are lost, the driver could lose control of the trailer or vehicle. In rare instances, the axle may cause the trailer to catapult into the air.

In the course of an average leaf spring failure, the driver may notice the trailer or vehicle exhibiting peculiar behavior such as fish tailing, dragging or riding at an uneven height. Generally, once the driver notices the leaf spring malfunction it is too late to prevent damage. Further even if the driver notices the leaf spring malfunction and is able to pull over to the side of the road before extensive and disabling damage is done to the tires, wheels and frame, the trailer is inoperable in that state. A common make-shift solution for drivers in this plight is to jack up the trailer frame and place blocks of wood or the like between the frame and the axle. These blocks act as spacers between the axle and the frame so that the tires will not rub against the frame or wheel wells. Sometimes duct tape, rope or other fastening material is used to hold the spacer blocks in place longitudinally. Using this temporary solution, the disabled driver limps home with the trailer or vehicle, often with more failures and subsequent re-adjustments along the way.

SUMMARY OF THE INVENTION

In one aspect of the invention, an apparatus for automatic lifting upon failure of structural support comprises a housing including a first housing element and a second housing element, wherein the second housing element is positioned within and slidably coupled to the first housing element forming an interior cavity. A lifting device is positioned within the interior cavity, wherein upon actuation the lifting device moves the first housing element in relation to the second housing element to maintain a predetermined distance between the first housing element and the second housing element. The automatic lifting apparatus further includes a trigger device to actuate the lifting device. Preferably, the trigger device is a compressed gas cartridge and the lifting device comprises an inflatable air bag. The lifting device is actuated by pressure on the first housing element or the second housing element. The lifting device is removable and replaceable. The automatic lifting apparatus is used with leaf spring supported trailers and vehicles and provides vertical and longitudinal support in the event of leaf spring failure.

In another aspect of the invention, an apparatus for automatic lifting upon failure of leaf spring suspension systems comprises a first housing element including a first connecting end having a first opening. A second housing element including a second connecting end having a second opening is slidably coupled within the first housing element thereby forming a housing. A lifting device is positioned within the housing, wherein upon actuation the lifting device exerts force to maintain a distance between the first housing element and the second housing element. A trigger device is coupled to the lifting device wherein the lifting device is actuated by the trigger device. Preferably, the trigger device is a compressed gas cartridge and the lifting device comprises an inflatable air bag. The lifting device is actuated by pressure on the first housing element or the second housing element. The lifting device is removable and replaceable. The automatic lifting device is used with leaf spring supported trailers and vehicles and provides vertical and longitudinal support in the event of leaf spring failure.

Yet in another aspect of the invention, an apparatus comprises a trailer including a trailer frame and a trailer axle. A plurality of leaf springs are coupled to the trailer frame and to the trailer axle. An automatic lifting system is coupled to the trailer axle and the trailer frame for supporting the trailer frame upon failure of the leaf springs. The automatic lifting system comprises one or more automatic lifting apparatuses. The automatic lifting apparatuses further comprise an housing including a first housing element and a second housing element, wherein the second housing element is positioned within and slidable connected to the first housing element forming an interior cavity. A lifting device is positioned within the interior cavity, wherein upon actuation the lifting device moves the first housing element in relation to the second housing element to maintain a predetermined distance between the first housing element and the second housing element. The automatic lifting system is actuated upon failure of the leaf spring suspension system when gravity causes the trailer frame to drop. Once actuated, the automatic lifting system provides vertical and longitudinal support to the trailer frame and trailer axle.

According to another aspect of the present invention, a method of supporting a trailer upon failure of a leaf spring suspension system is disclosed. The method comprises the steps of coupling a first housing element to a trailer frame, coupling a second housing element to a trailer axle, forming a housing with the first housing element and the second housing element, and actuating a lifting device positioned within the housing. Actuating the lifting device occurs when a leaf spring fails to support the frame with respect to the axle. The method further comprises maintaining a predetermined distance of separation between the first housing element and the second housing element when actuated. The method further comprises providing an inflatable air bag for maintaining the predetermined distance. The method further comprises generating vertical and longitudinal support of the trailer frame and trailer axle.

Other features and advantages of the present invention will become apparent after reviewing the detailed description of the preferred embodiments set forth below.

BRIEF DESCRIPTION OF THE DRAWINGS

FIG. 3A illustrates the relationship between the first housing element, the second housing element and the lifting device, particularly the maximum compression without deploying the lifting device.

FIG. 3B illustrates the relationship between the first housing element, the second housing element and the lifting device, particularly the maximum extension of the automatic lifting apparatus.

FIG. 3C illustrates the relationship between the first housing element, the second housing element and the lifting device, particularly the maximum extension of the automatic lifting apparatus when the lifting device is deployed.

DETAILED DESCRIPTION OF A PREFERRED EMBODIMENT

Reference will now be made in detail to the preferred and alternative embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it should be noted that the present invention may be practiced without these specific details. In other instances, well known methods, procedures and components have not been described in detail as not to unnecessarily obscure aspects of the present invention.

Figure 1A:
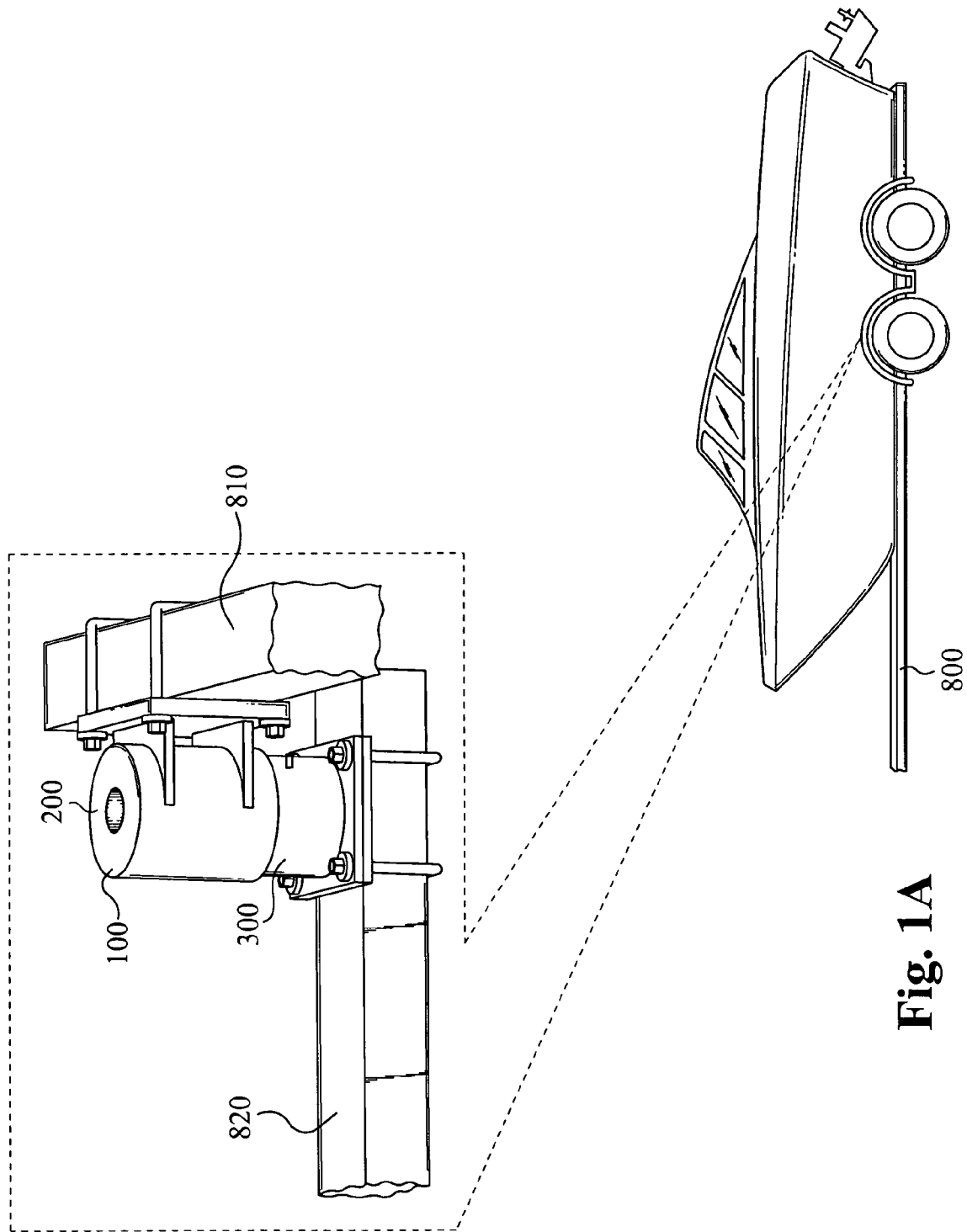
FIG. 1A illustrates a perspective view of the preferred embodiment of the automatic lifting apparatus coupled to a trailer in accordance with the present invention.
Figure 1B:
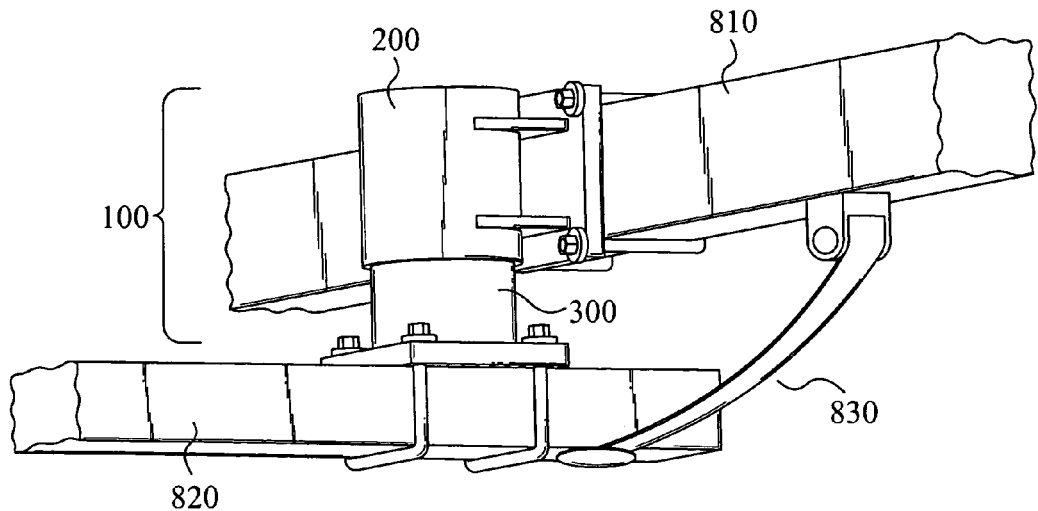
FIG. 1B illustrates a view of the preferred embodiment of the automatic lifting apparatus in accordance with the present invention when the leaf springs are operating correctly.
Figure 1C:
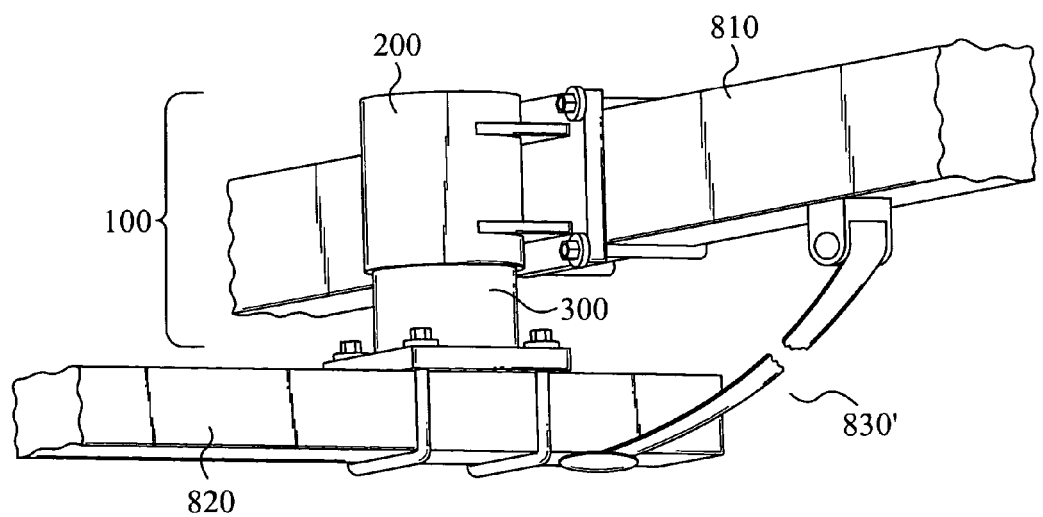
FIG. 1C illustrates a view of the preferred embodiment of the automatic lifting apparatus in accordance with the present invention when a leaf spring has malfunctioned.

An embodiment of an apparatus 100 for automatic lifting upon failure of structural support is illustrated in FIGS. 1A-1C. FIG. 1A illustrates the application of the automatic lifting apparatus 100 in a standard leaf spring supported trailer such as a boat trailer. The automatic lifting apparatus 100 is coupled to the trailer 800 to provide structural support when the trailer's leaf spring suspension system fails. FIG. 1B provides a more detailed illustration of how the automatic lifting apparatus 100 is coupled to the trailer 800. The trailer 800 (see FIG. 1A) includes a trailer frame 810, a trailer axle 820 and a leaf spring suspension system further including a plurality of leaf springs 830. The automatic lifting apparatus 100 comprising a first housing element 200 and a second housing element 300 is coupled to the trailer frame 810 and to the trailer axle 820, respectively. Until the leaf spring suspension system fails, the automatic lifting apparatus 100 remains inactive and moves with the natural flexes and struts of the leaf springs 830 during use.

When the leaf spring 830' fails, as illustrated in FIG. 1C, the automatic lifting apparatus 100 actively supports the weight of the trailer frame 810. The automatic lifting apparatus 100 becomes rigid when a deployed lifting device 400' (see FIG. 2) contained within the automatic lifting apparatus 100 provides structural support so that the trailer frame 810 does not fall onto the trailer tire 840 (see FIGS. 6A and 6B). The proper riding height of the trailer 800 is maintained since the automatic lifting apparatus 100 provides a predetermined distance of separation between the distal ends of the first housing element 200 and the second housing element 300.

Figure 2:
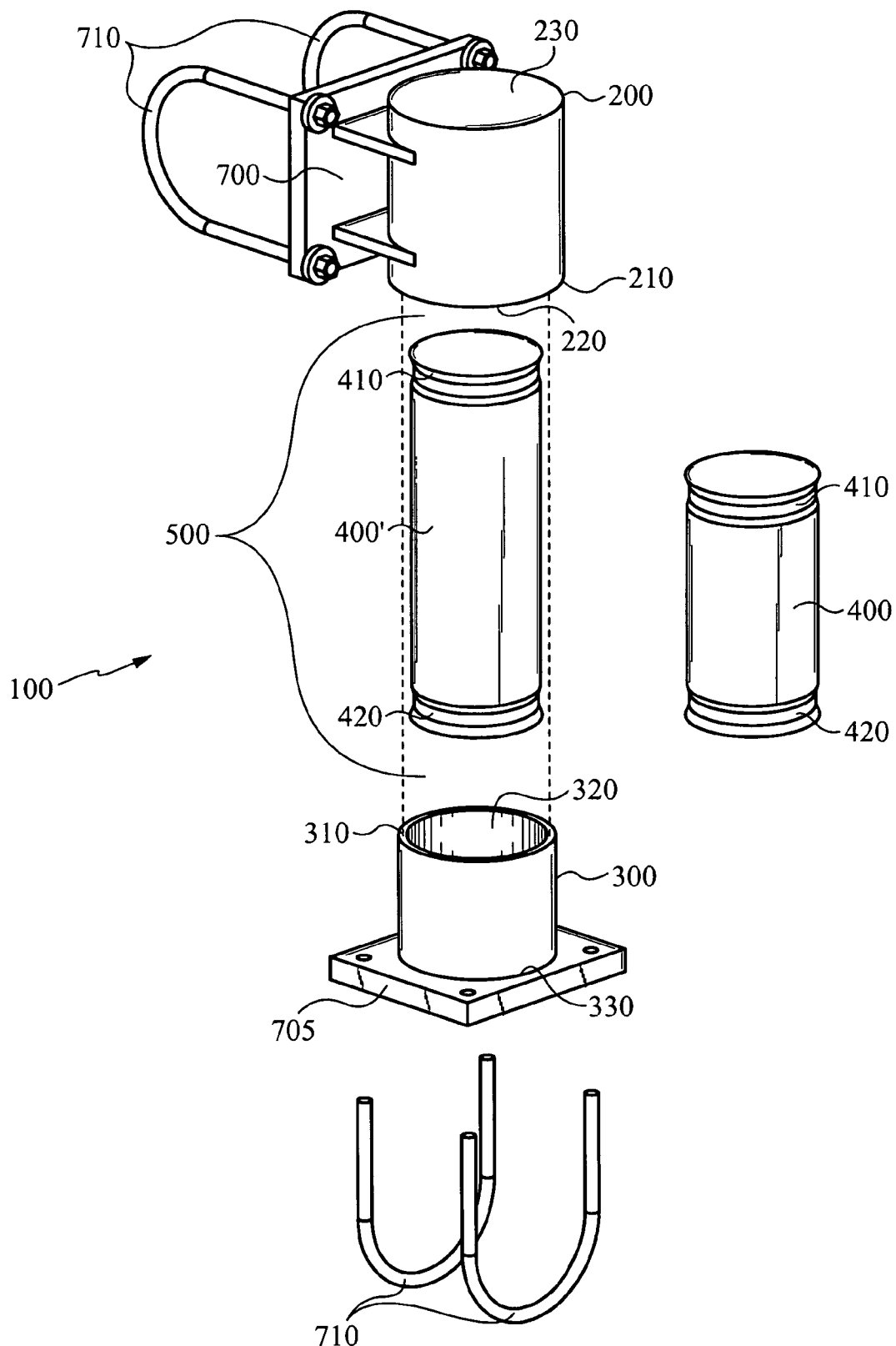
FIG. 2 illustrates an exploded view of the preferred embodiment of the automatic lifting apparatus in accordance with the present invention.

Now referring to the exploded view of the automatic lifting apparatus 100 in FIG. 2. The automatic lifting apparatus 100 includes a first housing element 200, a second housing element 300 and a lifting device 400 or 400' within the interior cavity 500 formed by the first housing element 200 and the second housing element 300. As illustrated in FIG. 2, the lifting device 400 is in its original, non-deployed state and the lifting device 400' is shown in a deployed state. The first housing element 200 includes a first connecting end 210 having a first opening 220 and a first closed end 230. The second housing element 300 includes a second connecting end 310 having a second opening 320 and a second closed end 330. The second connecting end 310 is sized smaller than the first connecting end 210 so that the second housing element 300 fits within the first housing element 200. Alternatively, the first connecting end 210 is sized smaller than the second connecting end 310 so that the first housing element 200 fits within the second housing element 300. Preferably, both housing elements 200 and 300 are made of any appropriate and strong material that will support the desired weight and withstand the shock pressure resulting from the deployment of the lifting device 400 as well as the normal wear and tear exhibited by a trailer.

FIG. 2 further illustrates the lifting device 400 positioned in the interior cavity 500. The lifting device has a lift top 410 and a lift base 420. Preferably, the lift top 410 and the lift base 420 are made of any appropriate and durable material that will withstand sudden pressure and collision with the inside of the first housing element 200 and the second housing element 300. The lifting device 400 may be predominately housed either in the first housing element 200 or the second housing element 300 when not deployed. As illustrated, the deployed lifting device 400' is larger than the non-deployed lifting device 400.

The lifting device 400 is removable and replaceable after deployment or for maintenance purposes. Preferably, the entire lifting device 400 is removable through an access opening at the top of the first housing element 200, or alternatively the access opening is on the second housing element 300. Preferably, the first housing element 200 has a thread pattern at the first closed end 230 that is unscrewed for access to the interior cavity 500 of the housing. Alternatively, the second housing element 300 has a thread pattern at the second closed end 330 that is unscrewed for access to the interior cavity 500 of the housing. Once the cavity 500 is opened, the lifting device 400 is easily removable and replaceable. The lifting device 400 is coupled to the first housing element 200, or alternatively the lifting device 400 is coupled to the second housing element 300. The lifting device 400 is preferably coupled by screwing the lifting device 400 into a thread pattern. Preferably, the entire lifting device 400 is disposable and replaceable. Alternatively, the lifting device 400 is resettable and reusable by the user.

The first housing element 200 is coupled to a first mounting bracket 700 and the second housing element 300 is coupled to a second mounting bracket 705. The mounting brackets 700 and 705 each accept one or more U-bolts 710 or other similar connecting parts for coupling the housings to a platform desired to be supported, such as a trailer frame, or a base support, such as a trailer axle. The mounting brackets 700 and 705 are coupled to any surface of the first housing element 200 and the second housing element 300 so that the U-bolts 710 are positioned to hold the first housing element 200 and second housing element 300 in the desired location.

Now referring to the operational specifics of the apparatus 100 in FIGS. 3A-3C. The second housing element 300 is concentrically and slidably coupled within the first housing element 200 along a connecting axis 600. In FIGS. 3A and 3B, the first housing element 200 and the second housing element 300 are freely moveable along the connecting axis 600 between the fully extended position 610 (FIG. 3B) and the threshold level 620 (FIG. 3A). Stopping elements 250 and 350 prevent the automatic lifting apparatus 100 from extending beyond a fully extended position 610. The stopping element 250 is coupled to the first housing element 200, and the stopping element 350 is coupled to the second housing element 300. Alternatively, a single stopping element is used to prevent extension beyond a fully extended position 610. When movement along the connecting axis 600 exceeds the allowable range of motion 630, an inner side of the first closed end 230 penetrates the threshold level 620.

In FIG. 3C, when the threshold level 620 is penetrated, the lifting device 400' is deployed by actuation of a trigger device. Upon deployment of the lifting device 400', an internal pressure expands the lifting device 400' so that force is exerted outwardly on the lift top 410 and the lift base 420. When the deployed lifting device 400' is fully expanded, the lift top 410 applies constant force to the inner side of the first closed end 230, and the lift base 420 applies constant force to the inner side of the second closed end 330. This simultaneous and constant force generates a support and maintains a predetermined distance of separation between the distal end of the first housing element 200 and the distal end of the second housing element 300 so that the automatic lifting apparatus 100 remains in the fully extended position 610.

Figure 4A:
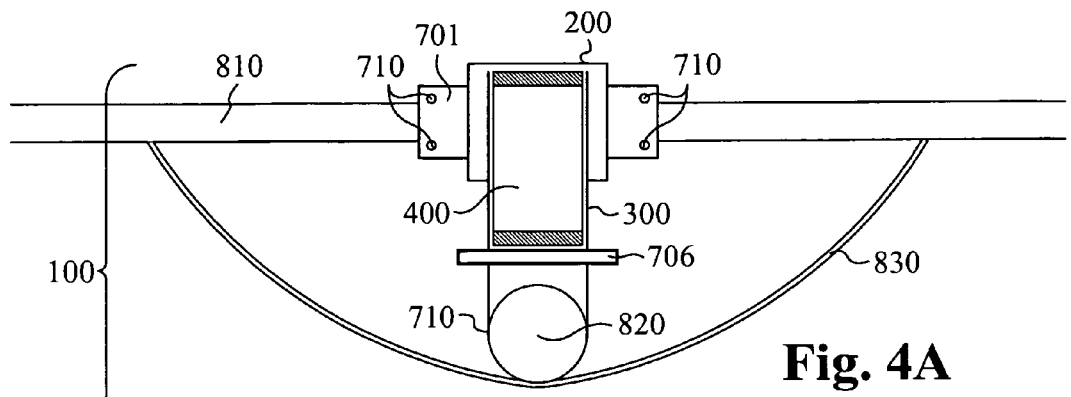
FIG. 4A illustrates a perspective view of the preferred embodiment of the automatic lifting apparatus in accordance with the present invention when the leaf springs are compressed and operating correctly.
Figure 4B:
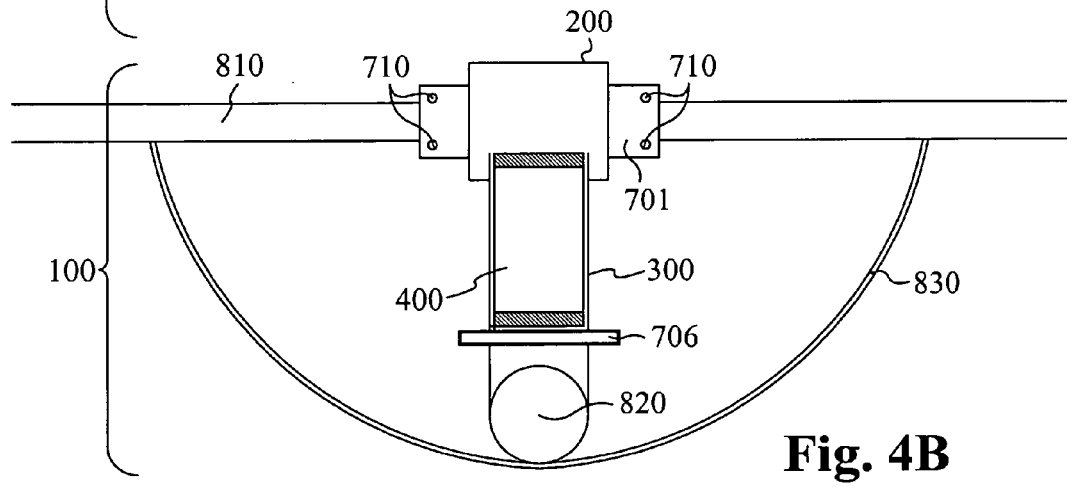
FIG. 4B illustrates a perspective view of the preferred embodiment of the automatic lifting apparatus in accordance with the present invention when the leaf springs are relaxed and operating correctly.
Figure 4C:
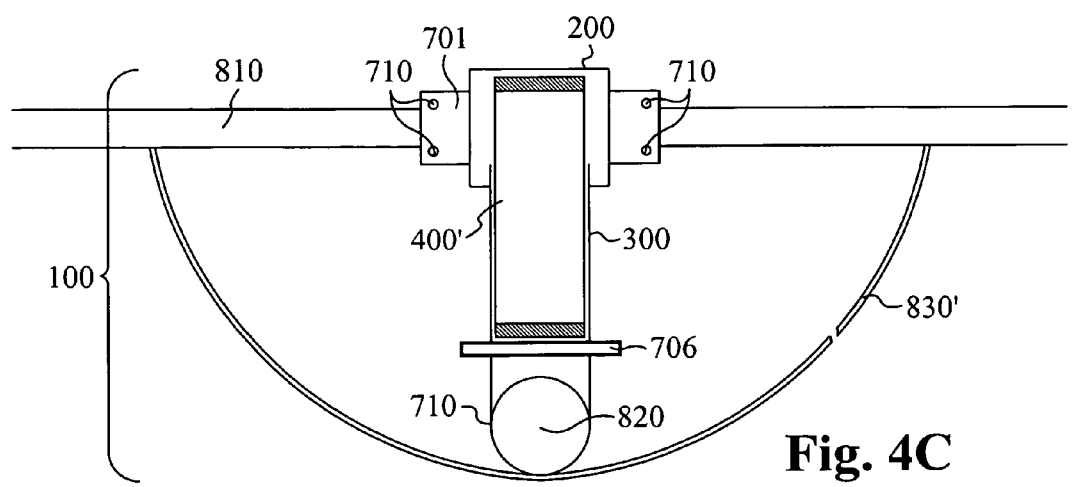
FIG. 4C illustrates a perspective view of the preferred embodiment of the automatic lifting apparatus in accordance with the present invention when at least one of the leaf springs has malfunctioned.

Now referring to FIGS. 4A-4C, a frame-mounted housing comprises a frame-mounted bracket 701 coupled to the side of the first housing element 200, and an axle-mounted housing comprises an axle-mounting bracket 706 coupled to the bottom of the second housing element 300. Alternatively, a frame-mounted housing comprises a frame-mounted bracket 701 coupled to the side of the second housing element 300, and an axle-mounted housing comprises an axle-mounting bracket 706 coupled to the bottom of the first housing element 200. The frame-mounted bracket 701 functions to couple a trailer 800 to the apparatus 100. To accomplish this, the U-bolts 710 of the frame-mounted bracket 701 are attached to secure and hold a portion of the trailer frame 810 located substantially above an axle 820. The axle-mounted bracket 706 functions to couple a trailer 800 to the apparatus 100. To accomplish this, the U-bolts 710 of the axle-mounted bracket 706 are attached to secure and hold a portion of the trailer axle 820.

In normal operation, the automatic lifting apparatus 100 is passive; the frame-mounted housing 200 and the axle-mounted housing 300 move freely relative to each other as the leaf spring 830 naturally flexes and struts according to the load weight and the road traveled. The allowable range of vertical movement 630 is from full extension 610 to approximately the threshold level 620 (see FIGS. 3A-3C). When the range of vertical movement does not exceed the allowable range 630, the lifting device 400 is inactive. The lifting device 400 remains inactive, in a non-deployed state (see FIG. 2), until the leaf spring 830' malfunctions or breaks. Upon malfunction of the leaf spring 830', the trailer frame falls onto the tire 840 (see FIGS. 6A and 6B) which rubs the wheel well. The range of allowable vertical movement 630 is exceeded and the threshold level 620 is penetrated (see FIG. 3C).

Now referring to FIG. 4C, upon penetration of the threshold level 620, the lifting device 400' is deployed and exerts a force against the inner side of the first closed end 230 and the second closed end 330 (see FIG. 3C). This exerted force separates the first housing element 200 and the second housing element 300. The lifting device 400' separates the first housing element 200 and the second housing element 300 until a predetermined distance of separation has been achieved. The predetermined distance of separation is the distance between the position of full extension 610 and approximately the position of the axle. Now the lifting device 400' is deployed and the operating height is maintained at full extension 610.

Once the lifting device 400' is deployed, the automatic lifting apparatus 100 cannot freely move since the deployed lifting device 400' is expanded and occupies the entire interior cavity 500. At this point, movement is restricted and the automatic lifting apparatus 100 remains in a position of full extension 610. Further, the trailer axle 820 maintains the proper positioning since the axle-mounted housing element 300 and the frame-mounted housing element 200 give longitudinal support to the trailer axle 820 with respect to the trailer frame 810. The deployed lifting device 400' allows some limited movement once deployed. This limited movement serves as a dampening function and provides an amount of protection against rough roads.

Figure 5:
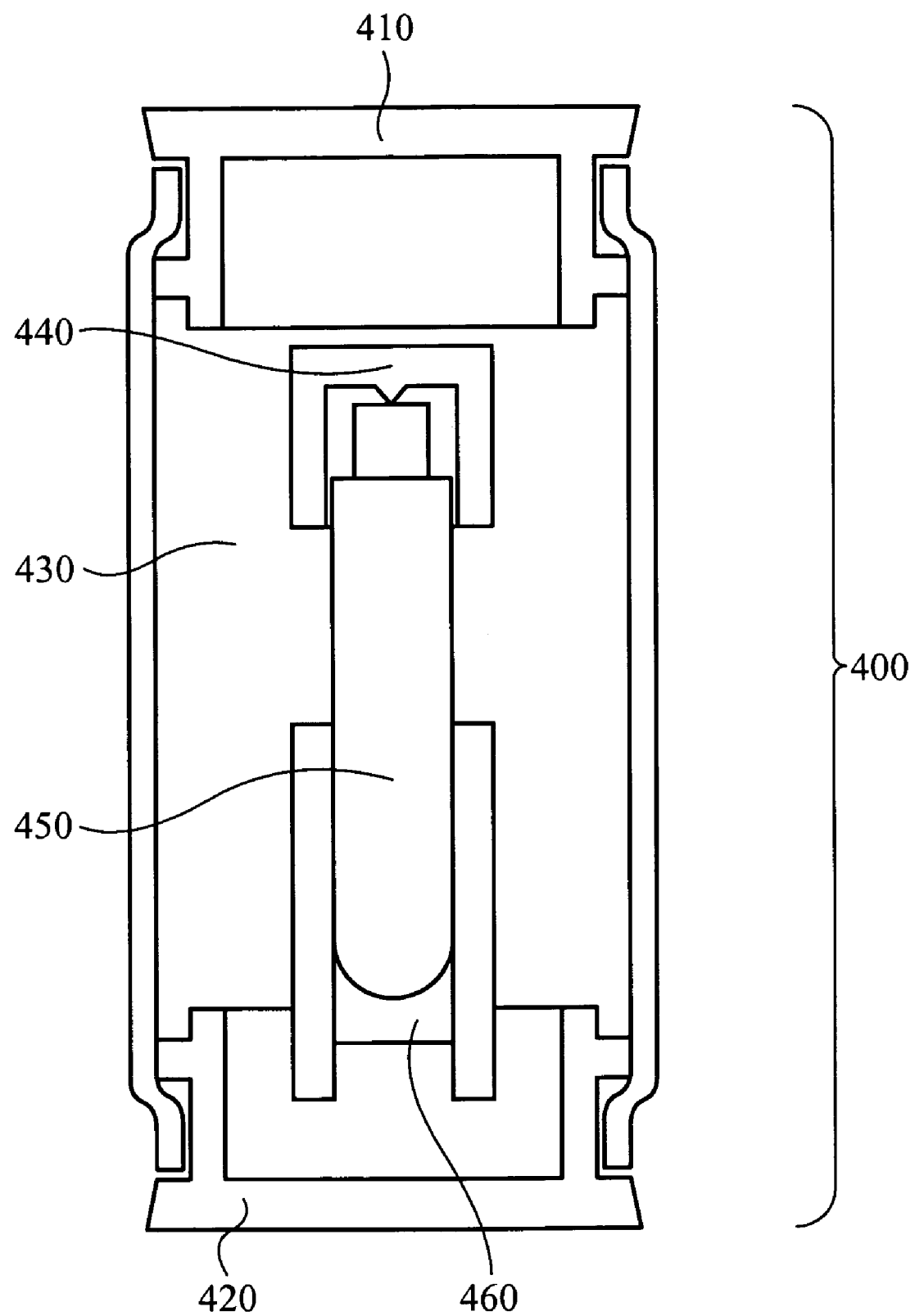
FIG. 5 illustrates a perspective view of the preferred embodiment of the lifting device in accordance with the present invention.

Now referring to FIG. 5, an embodiment of the lifting device is shown utilizing an inflatable bag. The lift top 410 and the lift base 420 are coupled and sealed to an inflatable air bag 430. The lift base 420 comprises a collet 460 which accepts and holds a compressed gas cartridge 450, such as carbon dioxide. There is a firing pin 440 coupled to the compressed gas cartridge 450. When the allowable range of motion 630 is exceeded by penetration of the threshold level 620 (see FIGS. 3A-3C), the lift top 410 is forced into contact with the firing pin 440. The firing pin 440 then punctures the compressed gas cartridge 450 so that the highly compressed gas escapes the cartridge 450 and fills the inflatable air bag 430. As the gas escapes from the cartridge 450, the lift top 410 and the lift base 420 move away from each other and into the deployed position. Pressure is exerted outwardly from the lift top 410 and the lift base 420 onto the inner side of the first housing element 200 and the second housing element 300. As this pressure is applied, the first housing element 200 and the second housing element 300 are moved into the fully extended position 610 (see FIG. 3C).

Alternatively, the lifting device includes an air pump. Such an embodiment is substantially similar to the inflating air bag embodiment above. In this embodiment, the inflation of the lifting device 400 occurs as a result of a pump device that is actuated upon the failure of the leaf spring and the subsequent gravitational catalyst acting on the trailer frame. The pump increases the pressure within the inflatable air bag and lifts the frame to the appropriate level. Yet another alternative embodiment of the lifting device includes a coil spring and release mechanism. In this embodiment, upon failure of the support structure, the coil spring is actuated by a release mechanism. The coil spring forces the first housing element 200 and the second housing element 300 into a position of full extension 610. The result in both alternative embodiments is the same; the vertical and longitudinal support to the trailer frame and the trailer axle is restored. Both alternative embodiments result in a dampening function as well.

Figure 6A:
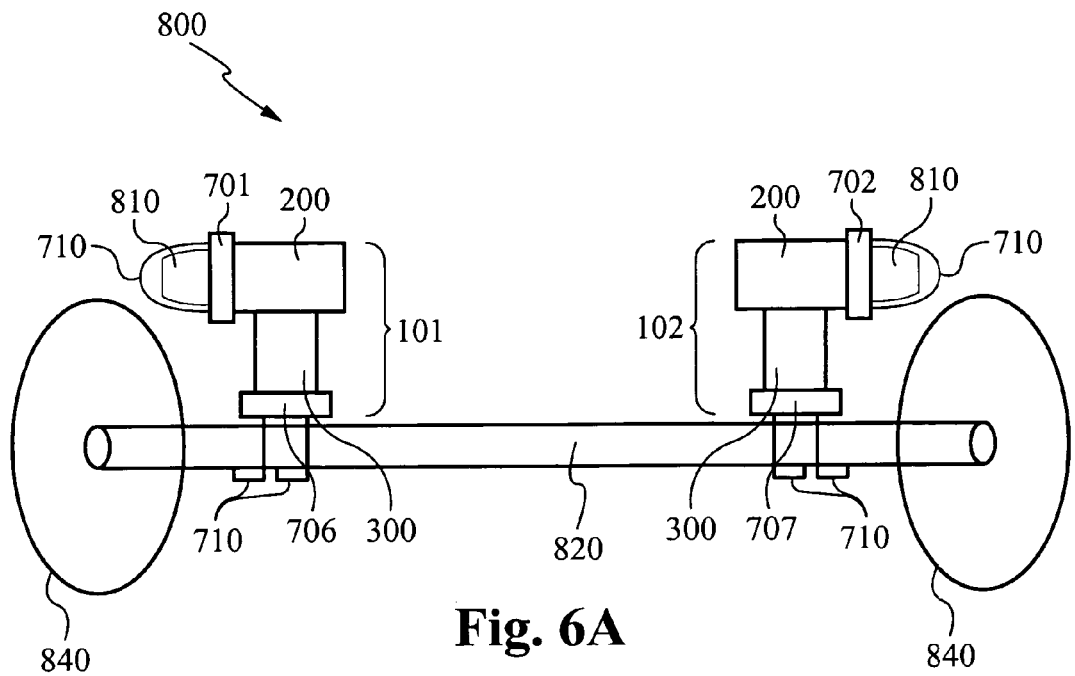
FIG. 6A illustrates a perspective view of the preferred embodiment of the automatic lifting system coupled to a trailer in accordance with the present invention.

FIG. 6A shows the preferred embodiment of a complete assembly of a trailer 800 including a system of automatic lifting apparatuses. As illustrated in FIG. 6A, a left automatic lifting apparatus 101 and a right automatic lifting apparatus 102 may be placed near either end of a trailer axle 820. In this configuration, the left automatic lifting apparatus 101 is coupled substantially near the left end of the axle 820 by the axle-mounted brackets 706 and is further coupled on a portion of the frame located vertically above the left end of the axle 820 by the frame-mounted bracket 701. The right automatic lifting apparatus 102 is coupled substantially near the right end of the axle 820 by the axle-mounted brackets 707 and is further coupled on a portion of the frame located vertically above the right end of the axle 820 by the frame-mounted bracket 702. U-bolts or similar connecting components 710 are used for the coupling of the mounting brackets to the axle and frame. If a left leaf spring fails, the left lifting apparatus 101 will be actuated by the pressure generated by the falling weight of the left side of the trailer frame. The left automatic lifting apparatus 101 will restore the left side of the trailer to proper operating height and will maintain longitudinal support of the axle with respect to the frame. If a right leaf spring fails, the right lifting apparatus 102 will be actuated by the pressure generated by the falling weight of the right side of the trailer frame. The right automatic lifting apparatus 102 will restore the right side of the trailer to proper operating height and will maintain longitudinal support of the axle with respect to the frame.

Figure 6B:
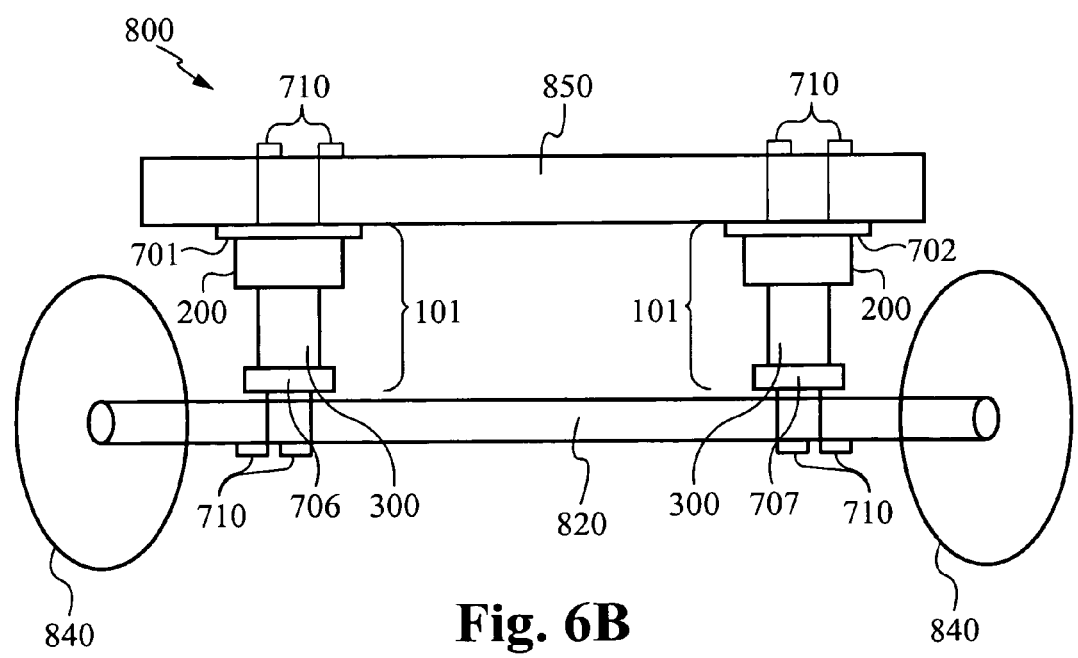
FIG. 6B illustrates a perspective view of an alternative embodiment of the automatic lifting system coupled to a trailer in accordance with the present invention.

In an alternative embodiment, shown in FIG. 6B, two automatic lifting apparatuses, a left automatic lifting apparatus 101 and a right automatic lifting apparatus 102, are coupled to a trailer frame cross member 850 substantially near either end of a given axle 820. In this configuration, the left automatic lifting apparatus 101 is coupled substantially near the left end of the axle 820 by the axle-mounted brackets 706 and is further coupled on the trailer frame cross member 850 located vertically above the left end of the axle 820 by the frame-mounted bracket 701. The right automatic lifting apparatus 102 is coupled substantially near the right end of the axle 820 by the axle-mounted brackets 707 and is further coupled on the trailer frame cross member 850 located vertically above the right end of the axle 820 by the frame-mounted bracket 702. U-bolts or similar connecting components 710 are used for the coupling of the mounting brackets to the axle and frame. If a left leaf spring fails, the left lifting apparatus 101 will be actuated by the pressure generated by the falling weight of the left side of the trailer frame. The left automatic lifting apparatus 101 will restore the left side of the trailer to proper operating height and will maintain longitudinal support of the axle with respect to the frame. If a right leaf spring fails, the right lifting apparatus 102 will be actuated by the pressure generated by the falling weight of the right side of the trailer frame. The right automatic lifting apparatus 102 will restore the right side of the trailer to proper operating height and will maintain longitudinal support of the axle with respect to the frame.

A method of supporting a trailer upon failure of a leaf spring suspension is disclosed by the present invention. Referring back to FIG. 2, the automatic lifting apparatus 100 is assembled by positioning the second housing element 300 within the first housing element 200 to form a housing. Alternatively, the housing is formed by positioning the first housing element 200 within the second housing element 300. When forming the housing, stopping elements 250 and 350 are coupled to the first housing element 200 and the second housing element 300, respectively, so that the automatic lifting device 100 cannot overextend. Alternatively, a single stopping element is used. The automatic lifting apparatus 100 is made operational by positioning a lifting device 400 in the interior cavity 500 of the housing. Alternatively, the lifting device 400 is screwed into the interior cavity 500. The lifting device 400 is screwed into the inner side of the first closed end 230, or alternatively to the inner side of the second closed end 330. Once the lifting device 400 is positioned, the housing cavity 500 is closed by screwing the first closed end 230 to the first housing element 200, or alternatively the second closed end 330 to the second housing element 300.

Now referring back to FIG. 4A-4C, installing the automatic lifting apparatus 100 on a leaf spring supported trailer 800 is accomplished by coupling the first housing element 200 to the trailer frame 810 and coupling the second housing element 300 to the trailer axle 820. A frame-mounted bracket 701 couples the first housing element 200 and accepts the U-bolts 710 or similar connecting components for coupling the trailer frame 810 to the frame-mounted bracket 701. An axle-mounted bracket 706 couples the second housing element 300 and accepts U-bolts 710 or similar connecting components for coupling the trailer axle 820 to the axle-mounted bracket 706. Alternatively, the axle-mounted bracket 706 is coupled to the first housing element 200 and the frame-mounted bracket is coupled to the second housing element 300. FIGS. 1B and 1C illustrate the automatic lifting apparatus 100 installed on the trailer 800 from another perspective. FIG. 1B shows the automatic lifting apparatus 100 acting as a passive safety device when the leaf spring 830 is operating correctly. After leaf spring 830' fails, as illustrated in FIG. 1C, the automatic lifting apparatus 100 is no longer passive but is actively supporting the trailer.

The automatic lifting apparatus 100 has many advantages including promotion of safety and prevention of damage to property. When a leaf spring fails, the frame drops below the operating height and the axle is no longer connected to the trailer resulting in property damage. When the axle is no longer connected to the trailer, it bounces vertically and moves longitudinally to the trailer which torques and damages the trailer axle, the trailer frame, and other parts of the trailer. The combination of improper riding height and disconnected axle causes a number of problems resulting in property damage, including: hyper-wearing of the tires since the wheel cannot rotate, tire shredding due to contact with wheel well, and peeling wheel well paint from the heat generated by intense friction. Additionally, driver control is greatly reduced when the riding height and axle positioning is compromised. Accidents causing serious personal injury are not uncommon as a consequence of leaf spring failure. The present invention automatically senses failure of the leaf spring and corrects the problem before damage to the trailer occurs and before the leaf spring malfunction causes injury or death due to loss of vehicle control. Not only is property damage and personal injury avoided by the use of the present invention, but the user is further provided with a solution to the broken leaf spring. Since proper operating height and axle positioning is maintained, the user can drive the trailer or vehicle to a place where permanent repairs can be made.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. An apparatus for automatic lifting upon failure of a structural support comprising:
   a. a housing coupled to a structural support, the housing including a first housing element and a second housing element, wherein the second housing element is positioned within and slidably coupled to the first housing element forming an interior cavity;
   b. a lift device positioned within the interior cavity; and
   c. a trigger device coupled to the lift device, wherein the trigger device actuates the lift device upon failure of the structural support, and wherein upon actuation of the lift device, the lift device moves the first housing element in relation to the second housing element and maintains a predetermined distance between the first housing element and the second housing element.

2. The apparatus of claim 1 wherein the lift device comprises an inflatable air bag.

3. The apparatus of claim 2 wherein the trigger device comprises a compressed gas cartridge and a puncturing device, wherein the puncturing device ruptures the compressed gas cartridge upon failure of the structural support.

4. The apparatus of claim 3 wherein the compressed gas cartridge comprises a gas.

5. The apparatus of claim 1 wherein the lift device is removable and replaceable.

6. The apparatus of claim 1 wherein the trigger device is actuated by a pressure applied to one or more of the first housing element and the second housing element.

7. The apparatus of claim 1 wherein the structural support comprises a leaf spring supporting a frame of a trailer, wherein the first housing element is coupled to the leaf spring supported frame and the second housing element is coupled to an axle of the trailer.

8. The apparatus of claim 7 wherein the first housing element and the second housing element provide longitudinal and vertical support to the axle with respect to the frame upon failure of the leaf spring, and the actuation of the lift device.

9. An apparatus for automatic lifting upon failure of a leaf spring suspension systems comprising:
   a. a first housing element including a first connecting end having a first opening;
   b. a second housing element, including a second connecting end having a second opening, slidably coupled within the first housing element thereby forming a housing;
   c. a structural support coupled to the housing;
   d. a lift device positioned within the housing, wherein upon actuation, the lift device exerts force to lift the first housing element in relation to the second housing element and to maintain a distance between the first housing element and the second housing element; and
   e. a trigger device coupled to the lift device, wherein the lift device is actuated by the trigger device upon failure of the structural support.

10. The apparatus of claim 9 wherein the lift device comprises an inflatable air bag.

11. The apparatus of claim 10 wherein the trigger device comprises a compressed gas cartridge and a puncturing device, wherein the puncturing device ruptures the compressed gas cartridge upon failure of the structural support.

12. The apparatus of claim 11 wherein the compressed gas cartridge comprises a gas.

13. The apparatus of claim 9 wherein the lift device is removable and replaceable.

14. The apparatus of claim 9 wherein the trigger device is actuated by a pressure applied to one or more of the first housing element and the second housing element.

15. The apparatus of claim 9 wherein the structural support comprises a leaf spring coupled to a frame of a trailer, wherein the first housing element is coupled to the leaf spring supported frame and the second housing element is coupled to an axle of the trailer.

16. The apparatus of claim 15 wherein the first housing element and the second housing element provide longitudinal and vertical support to the axle with respect to the frame upon failure of a the leaf spring, and the actuation of the lift device.

17. An apparatus comprising:
   a. a trailer including a trailer frame and a trailer axle;
   b. at least one leaf spring coupled to the trailer frame and to the trailer axle to support the trailer frame; and
   c. at least one automatic lift system coupled to the trailer axle and the trailer frame for supporting the trailer frame upon failure of the at least one leaf spring, the automatic lift system further comprising:
      i. a housing comprising a first housing element coupled to the trailer frame and a second housing element coupled to the trailer axle, wherein the second housing element is positioned within and slidably coupled to the first housing element forming an interior cavity;

ii. a lift device positioned within the interior cavity; and iii. a trigger device coupled to the lift device, wherein the trigger device actuates the lift device upon failure of the leaf spring, and wherein upon actuation of the lift device, the lift device lifts the first housing element in relation to the second housing element and maintains a predetermined distance between the first housing element and the second housing element.

18. The apparatus of claim 17 wherein, upon failure of the at least one leaf spring, gravity causes the trailer frame to fall and causes actuation of the automatic lift system, resulting in vertical support of the trailer frame.

19. The apparatus of claim 17 wherein upon failure of the at least one leaf spring, gravity causes the trailer frame to fall and causes actuation of the automatic lift system, resulting in longitudinal support of the axle with respect to the trailer frame.

20. The apparatus of claim 17 wherein the automatic lift system includes:
    a. a first automatic lift apparatus positioned near a right leaf spring, wherein the first automatic lift apparatus supports a right side of the trailer frame above the axle; and
    b. a second automatic lift apparatus positioned near a left leaf spring, wherein the second automatic lift apparatus supports a left side of the trailer frame above the axle.

21. The apparatus of claim 20 wherein the first automatic lift apparatus is actuated when the right leaf spring fails and further wherein the second automatic lift apparatus is actuated when the left leaf spring fails.

22. The apparatus of claim 17 wherein the automatic lift system is coupled to a trailer frame cross member.

23. The apparatus of claim 22 wherein the automatic lift system includes:
    a. a first automatic lift apparatus which is actuated when a right leaf spring fails; and
    b. a second automatic lift apparatus which is actuated when a left leaf spring fails.

24. The apparatus of claim 17 wherein the lift apparatus, when deployed, further acts as a dampening mechanism.

25. A method of supporting a trailer upon failure of a leaf spring suspension which comprises:
    a. coupling a first housing element to a trailer frame;
    b. coupling a second housing element to a trailer axle;
    c. forming a housing with the first housing element and the second housing element;
    d. coupling a trigger device within the housing, wherein the trigger device comprises a compressed gas cartridge and a puncturing device, and wherein the trigger device is triggered when a leaf spring suspension fails to support the frame with respect to the axle;
    e. positioning a lift device within the housing, wherein the lift device is an inflatable air bag for moving the first housing element in relation to the second housing element;
    f. actuating the lift device positioned within the housing wherein the lift device is actuated when the trigger device is triggered, forming released gas; and
    g. filling the inflatable air bag with released gas, forming a filled bag, wherein the filled bag moves the first housing element in relation to the second housing element and maintains a predetermined distance of separation, thus restoring support to the frame with respect to the axle.

26. The method of claim 25 wherein actuating the lift device is accomplished when pressure is applied to the first housing element or the second housing element.

27. The method of claim 25 which further comprises generating a vertical support for the trailer frame with respect to the axle upon the leaf spring suspension failure.

28. The method of claim 25 further comprises generating a longitudinal support for the trailer axle with respect to the frame upon the leaf spring suspension failure.

29. An apparatus for automatic lifting upon failure of a structural support comprising:
    a. a housing coupled to a structural support, the housing including a first housing element and a second housing element, wherein the second housing element is positioned within and slidably coupled to the first housing element forming an interior cavity;
    b. a lift device positioned within the interior cavity; and
    c. a trigger device coupled to the lift device, wherein the trigger device ruptures and actuates the lift device upon failure of the structural support, and wherein upon actuation of the lift device, the lift device moves the first housing element in relation to the second housing element and maintains a predetermined distance between the first housing element and the second housing element.

30. A method of supporting a trailer upon failure of a leaf spring suspension which comprises:
    a. coupling a housing to a structural support, the housing comprising a first housing element and a second housing element, wherein the second housing element is positioned within and slidably coupled to the first housing element forming an interior cavity;
    b. positioning a lift device within the interior cavity; and
    c. coupling a trigger device to the lift device, wherein the trigger device actuates the lift device upon failure of the structural support, and wherein upon actuation of the lift device, the lift device moves the first housing element in relation to the second housing element and maintains a predetermined distance between the first housing element and the second housing element.

* * * * *

UNITED STATES PATENT AND TRADEMARK OFFICE
CERTIFICATE OF CORRECTION

PATENT NO. : 7,578,513 B2 Page 1 of 1
APPLICATION NO. : 11/179830
DATED : August 25, 2009
INVENTOR(S) : George Yonekura It is certified that error appears in the above-identified patent and that said Letters Patent is hereby corrected as shown below:

In Claim 9, at column 10, line 18, please replace "systems" with "system" so that the claim preamble correctly reads -- 9. An apparatus for automatic lifting upon failure of a leaf spring suspension system comprising: --

Signed and Sealed this

Twenty-fourth Day of November, 2009

David J. Kappos
*Director of the United States Patent and Trademark Office*